United States Patent Office 3,578,502
Patented May 11, 1971

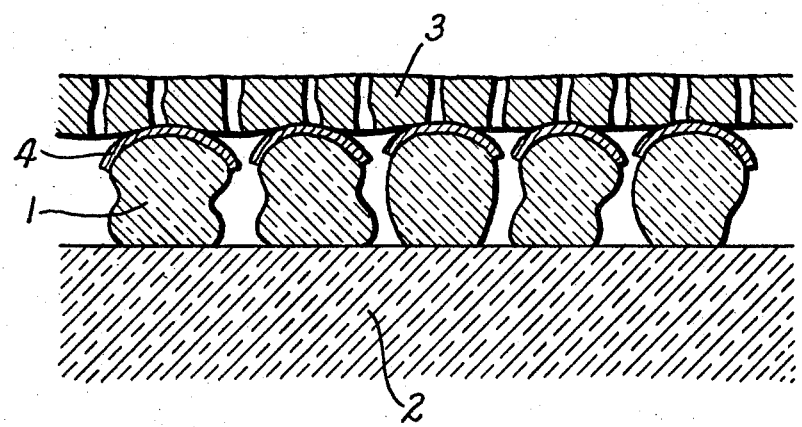

3,578,502
STABILIZED ZIRCONIUM OXIDE ELECTRODE
FOR SOLID ELECTROLYTE FUEL CELL
Helmut Tannenberger, Geneva, and Paul Kovacs,
Carouge, Geneva, Switzerland, assignors to Compagnie
Francaise de Raffinage, Paris, France
Filed July 18, 1968, Ser. No. 760,394
Claims priority, application Switzerland, July 19, 1967,
10,254/67
Int. Cl. H01m 27/04, 27/16
U.S. Cl. 136—120          8 Claims

ABSTRACT OF THE DISCLOSURE

An electrode has been provided for a solid electrolyte containing fuel cell suitable for high temperature operations, comprising a first porous layer and a second porous layer, said first porous layer comprising at least one layer of granules of a ceramic material capable of conducting oxygen ions and electrons generated in said fuel cell, said granules being in contact with the electrolyte with at least a part of surfaces of said granules, at least a part of other surfaces of said granules being in contact with a material possessing good electron conductivity, said material being in turn in contact with a second porous layer, said second porous layer being a good conductor of electrons and in an electrical contact with said granules, said layers constituting an electrode which in the cell allows the ready access to said granules of fuel or comburant gas.

---

The present invention relates to an electrode for a solid electrolyte fuel cell operating at high temperature.

As it is known, solid electrolytes which can be used industrially in fuel cells operating at high temperature are ceramic materials, in particular, those having as a base zirconium or thorium oxide. Such materials when brought to temperatures above 600° C. have a remarkable oxygen ion O= conductivity and, therefore, a relatively low electrical resistivity of the order of a few dozen ohms-centimeter at 800° C.

The electrodes used for making fuel cells utilizing the ionic conductivity of these solid electrolytes generally consist of metals, in particular transition metals, or oxides having a good electron conductivity such as nickel oxide or a mixture of oxides of strontium, lanthanum and cobalt.

These two types of electrodes, consisting of materials which conduct oxygen ions only very slightly, if at all, give rise to an undesirable phenomenon known as polarization which phenomenon for an electrolyte of a given composition and thickness reduces the amount of electrical energy supplied by the cell by causing a voltage drop which adds onto the ohmic loss (resistance) in the electrolyte layer itself and which is greater, i.e., increases, when the intensity of the current delivered by the cell is higher, i.e., resistance increases with increasing current.

The exact causes of this polarization phenomenon are not yet fully known but great differences are observed depending on the nature and structure of the electrodes. One of the main causes of polarization, particularly with regard to the cathode of a solid electrolyte fuel cell, probably resides in the relatively great difficulty of circulation through the electrode/electrolyte assembly of (a) oxygen which is the combustion supporting agent generally employed (comburant); (b) the electrons necessary for the ionizing of oxygen and which come from the outer circuit; and, finally, (c) oxygen ions which constitute the electric charge carriers permitting the passage of the current through the electrolyte.

It is generally agreed that in the event the electrolyte conducts only ions, the electrochemical ionization reaction of the oxygen expressed as

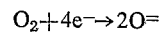

$$O_2 + 4e^- \rightarrow 2O^=$$

can take place only at certain points or lines of contact between three phases, namely oxygen (in gaseous or dissolved state), the electrode, and the electrolyte. Such a hypothesis is corroborated by the fact that a porous cathode structure (which permits easy penetration of gaseous oxygen within the pores of the said electrode up to the points of contact between the electrode and the electrolyte) favors a decrease in the polarization of the said electrode. Furthermore, among the metals, silver known for having a very high power of dissolving oxygen, gives the best results even when non-porous cathodes are made of this metal. However, it is evident that in the case of metals which do not dissolve oxygen, the limiting of the place of the electrochemical reaction at the points or lines of contact between three phases considerably reduces the effective or active surface of the electrode; and in the case of the metals which dissolve a certain amount of oxygen, the electrochemical reaction remains impeded by the solution capacity, i.e., the degree of solvalysis, of this gas in the constituent metal of the electrode and by the relatively slow rate of diffusion of the dissolved oxygen through the electrode.

What has just been stated in reference to the cathode of a fuel cell is also to a great extent applicable to the anode where the reverse electrochemical reaction to that described above takes place; furthermore, this reverse electrochemical reaction probably is taking place simultaneously with the combustion of oxygen. In this latter case, evidently, a porous structure of the electrode is the most favorable structure for the limiting of the polarization, since it also makes it possible to evacuate readily water and $CO_2$ formed by the reaction.

In addition to the polarization phenomenon, metal electrodes have the drawback of having great differences in physical properties when compared to an electrolyte, particularly with regard to the coefficient of expansion. This expansion increases the risk of loosening the electrode when the cell is subjected to alternate heating and cooling, as is normally true in industrial use. When such loosening takes place, the number of points of contact between three phases decreases, likewise, the active surface area of the electrode, while at the same time energy losses by polarization increase. If this loosening (or separation) phenomenon assumes too great an extent, the cell can no longer deliver sufficient energy and may even be destroyed by complete separation of the metal electrode from the electrolyte.

The use of presently known ceramics for the electrodes of solid electrolyte fuel cells operating at elevated temperature only partially solves the above problems. Although of a ceramic nature, these materials have physical properties which differ from those of the electrolytes. Furthermore, as these materials only conduct electrons, these materials do not make it possible to eliminate the causes of polarization mentioned above.

The object of the present invention is an electrode for solid electrolyte fuel cell which operates at high temperature, and which makes it possible to overcome to a large extent the said disadvantages. This electrode is characterized by the fact that it is a combination of a first porous layer and a second porous layer in which the first is formed of granules of a ceramic material which conducts oxygen ions and electrons. These granules in the first layer are rigidly connected with the electrolyte, i.e., on at least a part of their contact surface with it. At least a part of their opposite surface of these electrodes is covered by a material of good electronic conductivity. Moreover, the combination electrode is characterized by the fact it comprises as a second porous layer a material which is a good conductor of electrons arranged in such a manner as to form an electric contact between the assembly of granules of the first layer. This assembly of the two porous layers constitutes the electrode being so arranged as to permit readily a combustible or combustion-supporting (comburant) gas to come into contact with the free surfaces of the granules of the first layer.

The sole figure of the accompanying drawing shows schematically by way of example and on a greatly enlarged scale a section through a part of the novel electrode and a region of the electrolyte close to said electrode.

Referring to the figure, the electrode is formed of a first layer of granules 1 of more or less spherical shape of a ceramic material which conducts oxygen ions and electrons and is rigidly connected to the electrolyte 2 at a part of their lower section. As the second layer for the electrode, designated as 3 in the figure, an electronically conductive and porous material is used. Further, reference numeral 4 designates a material of good conductivity used to enhance the transfer of electrons between granules 1 and second layer 4.

The best and preferred results have been obtained when using as ceramic material conductive of oxygen ions and electrons a ternary mixture of $ZrO_2$—$Yb_2O_3$—$UO_2$ oxides comprising between 78 and 86 mol percent of zirconium oxide, between 8 and 12 mol percent of the ytterbium oxide and between 4 and 12% uranium oxide.

Alternatively, a tertiary mixture of $ZrO_2$—$Me_2O_3$—$UO_2$ or $ZrO_2$—$MeO$—$UO_2$ can also be used. In this mixture $Me_2O_3$ and $MeO$ represent a trivalent or bivalent metal oxide, respectively, which oxide (or oxides) is capable of stabilizing the cubic phase of the zirconia, moreover, said oxide being also one of the oxides used to stabilize the cubic phase of the zirconia used as electrolyte, as disclosed in a copending application, Ser. No. 325,503, filed Nov. 21, 1963. This oxide(s) is a heavy rare earth oxide, desirable scandium or yttrium oxide or a calcium or magnesium oxide. Instead of the ytterbium oxide, a mixture of rare earth oxides can also be used; and instead of uranium oxide, cerium oxide can be employed. A mixture of uranium oxide and cerium oxide can also be used.

Thus, the ceramic material which conducts oxygen ions and electrons has the same stabilized zirconia nature as the electrolyte and its composition, and aside from the presence of uranium oxide, is very close to that of the electrolyte.

The granule dimensions which give the best results are from 10 to 50 microns. Smaller granules can also be used. The shape of the granules must be such that their free or accessible surface is as large as possible. This means a spherical shape has been found to be the best; but granules of different shapes, e.g., cubic shape, can also be used.

The first layer can be formed of a plurality of sub-layers of granules; but the best results are obtained with a single sub-layer.

The electrode also comprises a second layer 3 of an essentially electronically conductive material, said second layer being both sufficiently electronically conductive and sufficiently porous to permit the easy passage of the electric current as well as to permit a fuel or comburant gas to come readily into contact with the free surfaces of the granules of the first layer.

As an electronically conductive material for the second layer 3, a metal is used, particularly one of the metals customarily employed as metal electrode, e.g., nickel or silver. A ceramic material which is a good electronic conductor can also be used, e.g., nickel oxide containing an addition of lithium oxide or mixed oxides of strontium, lanthanum, and cobalt, $Sr_xLa_{1-x}CoO_3$, wherein $x$ is between 0.1 and 0.5.

A part of the upper surface of each of the granules of the first layer is covered with a layer of a material of good electronic conductivity 4, which makes it possible to increase the active transfer surface of the electrons between the granules 1 which constitute the first layer and the second layer 3. For this intermediate covering, a substance can be used which is a good electronic conductor and which is compatible with the material of the granules 1 and that of the layer 3 and which withstands the combustible or comburant gases under the operating conditions of the cell. For example, the same material as that of layer 3 can be employed. Layer 4 is generally no thicker than 10 microns.

The free access of the combustible or comburant gas to the free surface of the first layer is obtained by imparting sufficient porosity to the second layer 3 and by arranging the granules 1 on a single layer on the electrolyte, these granules being separated from each other by intervals approximately equal to their own dimensions, e.g. 10 to 50 microns.

EXAMPLE

A cell element is provided with electrodes in accordance with the invention. This cell element is comprised essentially of a solid electrolyte layer of a thickness of 100 microns consisting of the mixed oxides of $ZrO_2$—$Yb_2O_3$ of a composition of 90–10, respectively (in mol percent) and two electrodes in accordance with the invention. These electrodes each have a first layer of 20 microns thickness formed of a single simple layer of granules of approximately spherical shape of an average diameter of 20 microns, of mixed oxides of $ZrO_2$—$Yb_2O_3$—$UO_2$ in proportions of 82:10:8, respectively (mol percent) The electrode has as a second layer nickel for the anode and silver for the cathode, each of the granules of the first layer being in part covered, on its upper face, by an intermediate layer consisting of the same metal as that of the corresponding second layer, assuring the contact between the first and second layers. By means of this cell element, there has been obtained a current density of 1.000 amp./cm.$^2$ under a voltage of 0.5 v. by operating the cell at 800° C., using air as combustion supporting agent (comburant) and as fuel, a mixture of hydrogen, carbon monoxide, water and carbon dioxide obtained by conversion of a hydrocarbon by a mixture of water and carbon dioxide.

Under the same conditions and with the same fuel and comburant, a cell element which has the same electrolyte and of the same thickness but is provided with metal electrodes, namely, a silver cathode and a nickel anode, produces only 200 milliamperes/cm.$^2$.

What is claimed is:

1. An electrode for a solid electrolyte containing fuel cell suitable for high temperature operations comprising an electrolytically conductive first porous layer which is contiguous to said electrolyte and is different from the electrolyte and a second porous layer on top of said first layer, said first porous layer comprising at least one layer of granules of a cubic phase stabilized zirconium oxide wherein the zirconium oxide is from 78 to 86 mole percent and has added thereto at least one oxide of calcium, magnesium, scandium, yttrium or an oxide of rare earth, and wherein the cubic phase stabilized zirconium oxide has in addition uranium oxide, cerium oxide or mixtures of same therein, and wherein said second porous layer in contact with said first layer is of nickel, silver, nickel oxide having added thereto lithium oxide, or mixed oxides of strontium, lanthanum, and cobalt.

2. The electrode according to claim 1 and wherein zirconium oxide has in addition uranium oxide therein.

3. The electrode according to claim 2 and wherein the zirconium oxide has therein between 8 to 12 mole percent ytterbium oxide and between 4 to 12 mole percent uranium oxide, the balance being zirconium oxide.

4. The electrode according to claim 1 and wherein zirconium oxide has therein a mixture of uranium oxide and cerium oxide.

5. The electrode according to claim 1 and wherein zirconium oxide has therein cerium oxide.

6. The electrode according to claim 1 and wherein between the first and second layer there is an additional layer on the granules of said first layer and said additional layer is of nickel, silver, nickel oxide in admixture with lithium oxide, or mixed oxides of strontium, lanthanum and cobalt.

7. The electrode according to claim 6 and wherein the additional layer is less than 10 microns thick.

8. The electrode according to claim 1 and wherein the granules of the first porous layer are from 10 to 50 microns in average diameter and the granules are separated from each other by a distance of about 10 to 50 microns.

References Cited

UNITED STATES PATENTS

| | | | |
|---|---|---|---|
| 3,300,344 | 1/1967 | Brag et al. | 136—86 |
| 3,410,728 | 11/1968 | Fullman et al. | 136—86 |
| 3,416,967 | 12/1968 | White | 136—86 |
| 3,377,203 | 4/1968 | Mobius et al. | 136—86 |

FOREIGN PATENTS

| | | | |
|---|---|---|---|
| 1,049,428 | 11/1966 | Great Britain | 136—86 |
| 757,714 | 4/1967 | Canada | 136—86 |

ALLEN B. CURTIS, Primary Examiner